(12) United States Patent
Ding et al.

(10) Patent No.: US 11,800,443 B2
(45) Date of Patent: Oct. 24, 2023

(54) POWER CONSUMPTION CONTROL METHOD, BASEBAND UNIT, RADIO UNIT, SYSTEM, AND STORAGE MEDIUM

(71) Applicant: Huawei Technologies Co., Ltd., Shenzhen (CN)

(72) Inventors: Zhenghu Ding, Shanghai (CN); Jiang Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 17/224,882

(22) Filed: Apr. 7, 2021

(65) Prior Publication Data
US 2021/0227460 A1   Jul. 22, 2021

Related U.S. Application Data

(63) Continuation of application No. PCT/CN2019/100049, filed on Aug. 9, 2019.

(30) Foreign Application Priority Data

Oct. 9, 2018 (CN) .......................... 201811172987.X

(51) Int. Cl.
*H04W 52/02* (2009.01)
*H04W 52/34* (2009.01)
(Continued)

(52) U.S. Cl.
CPC ..... *H04W 52/0206* (2013.01); *H04W 52/343* (2013.01); *H04W 52/367* (2013.01); *H04W 52/52* (2013.01)

(58) Field of Classification Search
CPC .......... H04W 52/0206; H04W 52/343; H04W 52/367; H04W 52/52; H04W 52/0258; Y02D 30/70
See application file for complete search history.

(56) References Cited

U.S. PATENT DOCUMENTS

2004/0213335 A1\* 10/2004 Forest .................. H03F 1/0205
455/73
2013/0203434 A1\* 8/2013 Blume ...................... H03F 3/24
455/452.1
(Continued)

FOREIGN PATENT DOCUMENTS

CN       1540876 A    10/2004
CN    101720123 A     6/2010
(Continued)

*Primary Examiner* — Farid Seyedvosoghi
(74) *Attorney, Agent, or Firm* — Leydig, Voit & Mayer, Ltd.

(57) ABSTRACT

A power consumption control method, baseband unit (BBU), radio unit (RU), system, and a storage medium are provided. The method includes: A BBU detects load of a to-be-detected cell. If the load of the to-be-detected cell is less than a first threshold, the BBU determines a first allowable power of a carrier corresponding to the to-be-detected cell. The BBU sends the first allowable power to an RU, to indicate to the RU to adjust, based on the first allowable power, a bias voltage of a power amplifier (PA) corresponding to the carrier corresponding to the to-be-detected cell. The first allowable power is less than a maximum allowable power of the carrier corresponding to the to-be-detected cell.

6 Claims, 7 Drawing Sheets

(51) Int. Cl.
*H04W 52/36* (2009.01)
*H04W 52/52* (2009.01)

(56) References Cited

U.S. PATENT DOCUMENTS

| | | |
|---|---|---|
| 2014/0040651 A1 | 2/2014 | Sota |
| 2015/0365890 A1* | 12/2015 | Rajendran ......... H04W 52/0206 370/311 |
| 2016/0036270 A1 | 2/2016 | Smith |
| 2016/0165546 A1* | 6/2016 | Sun ...................... H04L 5/0048 370/229 |
| 2016/0270006 A1* | 9/2016 | Choi .................... H04W 24/10 |
| 2016/0309350 A1* | 10/2016 | Dai ...................... H04W 24/02 |
| 2017/0156117 A1 | 6/2017 | Zhu |

FOREIGN PATENT DOCUMENTS

| | | |
|---|---|---|
| CN | 103281736 A | 9/2013 |
| CN | 103327582 A | 9/2013 |
| CN | 103841582 A | 6/2014 |
| CN | 104581906 A | 4/2015 |
| CN | 104918275 A | 9/2015 |
| EP | 2439988 A1 | 4/2012 |
| WO | 2016089273 A1 | 6/2016 |

\* cited by examiner

POWER CONSUMPTION CONTROL METHOD, BASEBAND UNIT, RADIO UNIT, SYSTEM, AND STORAGE MEDIUM

CROSS-REFERENCE TO RELATED APPLICATIONS

This application is a continuation of International Application No. PCT/CN2019/100049, filed on Aug. 9, 2019, which claims priority to Chinese Patent Application No. 201811172987.X, filed on Oct. 9, 2018. The disclosures of the aforementioned applications are hereby incorporated by reference in their entireties.

TECHNICAL FIELD

This application relates to the communications field, and in particular, to a power consumption control method, BBU, RU, system, and a storage medium.

BACKGROUND

With the rapid development of mobile communications, power consumption of a mobile communications system, especially power consumption of a base station in the mobile communications system, attracts more attention in the industry. In the power consumption of the base station, power consumption of a radio frequency unit (RU) accounts for a main part. In the RU, a power amplifier (PA) is a component whose power consumption is relatively high.

In the current technology, when there is no service on a carrier on a channel of the RU, a PA on the channel is usually disabled, to reduce the power consumption of the RU. However, in an actual scenario, the carrier is rarely unloaded. Therefore, in most cases, the power consumption of the RU is still relatively high. As a result, a corresponding solution is urgently required.

SUMMARY

This application provides a power consumption control method, BBU, RU, system, and a storage medium, to reduce power consumption of an RU.

According to a first aspect, this application provides a power consumption control method. The method includes: A baseband unit (BBU) detects load of a to-be-detected cell. If the load of the to-be-detected cell is less than a first threshold, the BBU determines a first allowable power of a carrier corresponding to the to-be-detected cell. Then the BBU sends the first allowable power to an RU. The RU receives the at least one first allowable power, and determines, based on the at least one first allowable power, a target bias voltage of a PA corresponding to the carrier corresponding to the to-be-detected cell. The RU adjusts a bias voltage of the PA to the target bias voltage. The first allowable power is less than a maximum allowable power of the carrier corresponding to the to-be-detected cell.

Based on this solution, when the BBU detects that the load of the to-be-detected cell is less than the first threshold, it indicates that the load of the to-be-detected cell is relatively low. In this case, the BBU determines that the maximum allowable power of the carrier corresponding to the to-be-detected cell may be reduced. The BBU reduces the current maximum allowable power of the carrier corresponding to the to-be-detected cell to the first allowable power, and sends the first allowable power to the RU. Because the first allowable power is less than the maximum allowable power, the RU may reduce, based on the received at least one first allowable power, the bias voltage of the PA corresponding to the carrier corresponding to the to-be-detected cell. In addition, because power consumption of the PA is positively correlated with the bias voltage of the PA, that the bias voltage of the PA is reduced helps reduce the power consumption of the PA, thereby further reducing power consumption of the RU.

In an embodiment, if the load of the to-be-detected cell is greater than a second threshold, the BBU determines a second allowable power of the carrier corresponding to the to-be-detected cell. The BBU sends the second allowable power to the RU, to indicate the RU to adjust, based on the second allowable power, the bias voltage of the PA corresponding to the carrier corresponding to the to-be-detected cell. After receiving a response message from the RU, the BBU cancels an amplitude limitation performed on a power of the carrier corresponding to the to-be-detected cell. The response message is sent by the RU after the RU completes adjusting the bias voltage. The second allowable power is equal to the maximum allowable power of the carrier corresponding to the to-be-detected cell. The second threshold is greater than the first threshold. In this way, when the load of the to-be-detected cell is relatively high, the amplitude limitation performed on the power of the carrier corresponding to the to-be-detected cell is canceled, so that a service of the to-be-detected cell may be sent at the maximum allowable power of the to-be-detected cell, thereby satisfying a service requirement of the to-be-detected cell as much as possible. In addition, only after receiving the response message from the RU, the BBU cancels the amplitude limitation performed on the power of the carrier corresponding to the to-be-detected cell, so that the BBU sends a baseband signal with a relatively high power to the PA after the PA in the RU operates at the maximum allowable power. This helps prevent the PA from operating in a non-linear area, and helps prevent a decline in a radio frequency specification of the RU.

In an embodiment, the BBU may determine, based on the maximum allowable power of the carrier corresponding to the to-be-detected cell and a preset amplitude limiting percentage parameter, the first allowable power of the carrier corresponding to the to-be-detected cell. The amplitude limiting percentage parameter is a positive number less than or equal to 1. For example, the first allowable power may satisfy the following formula: First allowable power=Maximum allowable power*Preset amplitude limiting percentage parameter.

According to a second aspect, this application provides a power consumption control method. The method includes: When detecting that load of a to-be-detected cell is less than a first threshold, a BBU determines a first allowable power of a carrier corresponding to the to-be-detected cell. The BBU sends the first allowable power to an RU. The RU receives the at least one first allowable power, and determines a target bias voltage of a power amplifier PA based on the at least one first allowable power. The RU adjusts a bias voltage of the PA to the target bias voltage. The first allowable power is less than a maximum allowable power of the carrier corresponding to the to-be-detected cell.

In this application, when the BBU detects that the load of the to-be-detected cell is less than the first threshold, it indicates that the load of the to-be-detected cell is relatively low. In this case, the BBU determines that the maximum allowable power of the carrier corresponding to the to-be-detected cell may be reduced. The BBU reduces the current maximum allowable power of the carrier corresponding to the to-be-detected cell to the first allowable power, and sends the first allowable power to the RU. Because the first allowable power is less than the maximum allowable power of the carrier corresponding to the to-be-detected cell, the RU may reduce, based on the first allowable power, the bias voltage of the PA corresponding to the carrier corresponding to the to-be-detected cell. In addition, because power consumption of the PA is positively correlated with the bias voltage of the PA, that the bias voltage of the PA is reduced helps reduce the power consumption of the PA, thereby further reducing power consumption of the RU.

In an embodiment, the RU may send a response message to the BBU. The response message is used to indicate that the RU completes adjusting the bias voltage. After receiving the response message from the RU, the BBU cancels an amplitude limitation performed on a power of the carrier corresponding to the to-be-detected cell. In this way, only after operating at the maximum allowable power, the PA in the RU can receive a baseband signal that is sent by the BBU at a relatively high power. This helps prevent the PA from operating in a non-linear area, and helps prevent a decline in a radio frequency specification of the RU.

In an embodiment, a target maximum allowable power of the PA includes the following two cases.

Case 1: If all carriers in the PA receive first allowable powers from the BBU, the target maximum allowable power is a sum of the first allowable powers of the carriers in the PA.

Case 2: If a part of carriers in the PA receive first allowable powers from the BBU, the target maximum allowable power is a sum of a maximum allowable power of a first carrier in the PA and the first allowable power of the carrier corresponding to the to-be-detected cell. The first carrier is a carrier on which power amplitude limiting does not need to be performed.

Based on the foregoing two scenarios, in an embodiment, the RU may determine the target maximum allowable power of the PA based on a specific scenario, and determine the target bias voltage corresponding to the target maximum allowable power.

According to a third aspect, this application provides a BBU. The BBU includes a transceiver and a processor. Optionally, the BBU further includes a memory. When the BBU includes the memory, the memory is configured to store an instruction. The processor is configured to: execute the instruction stored in the memory, and control the transceiver to send and receive a signal. When the processor executes the instruction stored in the memory, the BBU is configured to perform the method in any one of the first aspect or the implementations of the first aspect.

According to a fourth aspect, this application provides an RU. The RU includes a transceiver and a processor. Optionally, the RU further includes a memory. When the RU includes the memory, the memory is configured to store an instruction. The processor is configured to: execute the instruction stored in the memory, and control the transceiver to send and receive a signal. When the processor executes the instruction stored in the memory, the RU is configured to perform the method in any one of the second aspect or the implementations of the second aspect.

According to a fifth aspect, this application provides a BBU. The BBU is configured to implement the method in any one of the first aspect or the implementations of the first aspect, and includes corresponding functional modules that are separately configured to implement steps in the foregoing method. A function may be implemented by hardware, or may be implemented by hardware by executing corresponding software. The hardware or software includes one or more modules corresponding to the function.

In an embodiment, a structure of the BBU includes a processing unit and a transceiver unit. These units may perform corresponding functions in the foregoing method example. For details, refer to detailed descriptions in the method example. Details are not described herein again.

According to a sixth aspect, this application provides an RU. The RU is configured to implement the method in any one of the second aspect or the implementations of the second aspect, and includes corresponding functional modules that are separately configured to implement steps in the foregoing method. A function may be implemented by hardware, or may be implemented by hardware by executing corresponding software. The hardware or software includes one or more modules corresponding to the function.

In an embodiment, a structure of the RU includes a processing unit and a transceiver unit. These units may perform corresponding functions in the foregoing method example. For details, refer to detailed descriptions in the method example. Details are not described herein again.

According to a seventh aspect, this application provides a system. The system includes the foregoing BBU and the RU. The BBU may be configured to perform the method in any one of the first aspect or the possible implementations of the first aspect, and the RU may be configured to perform the method in any one of the second aspect or the possible implementations of the second aspect.

According to an eighth aspect, this application provides a computer storage medium. The computer storage medium stores an instruction, and when the instruction is run on a computer, the computer is enabled to perform the method in any one of the first aspect or the possible implementations of the first aspect, or the computer is enabled to perform the method in any one of the second aspect or the possible implementations of the second aspect.

According to a ninth aspect, this application provides a computer program product including an instruction. When the computer program product runs on a computer, the computer is enabled to perform the method in any one of the first aspect or the possible implementations of the first aspect, or the computer is enabled to perform the method in any one of the second aspect or the possible implementations of the second aspect.

DESCRIPTION OF EMBODIMENTS

Figure 1:
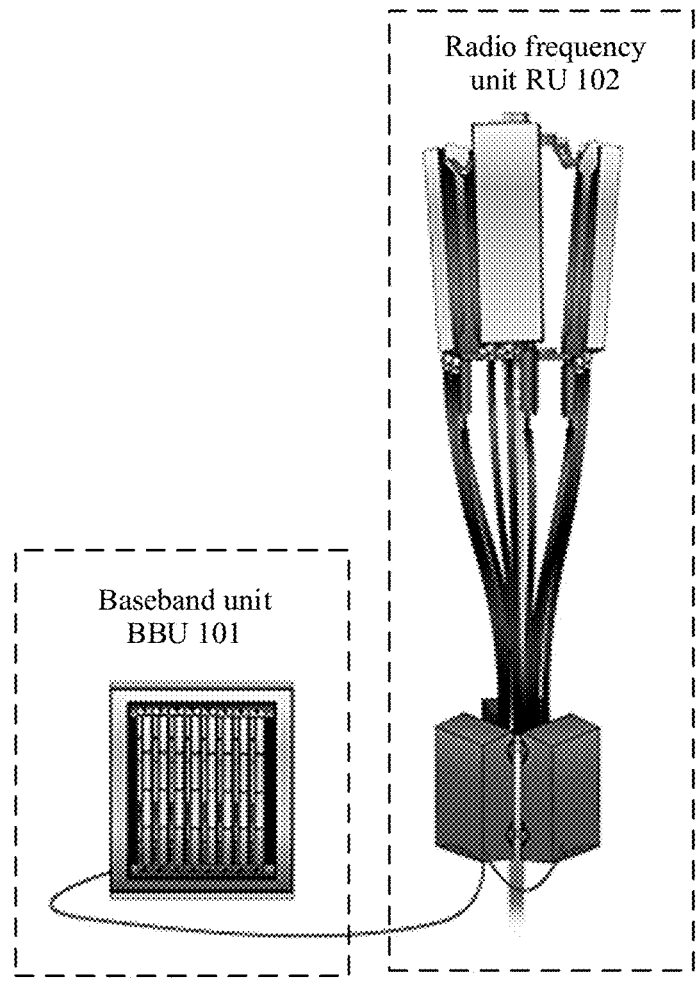
FIG. 1 is a schematic architectural diagram of a system according to this application.

FIG. 1 is a schematic architectural diagram of a system according to this application. The system includes at least one BBU and at least one RU. In FIG. 1, an example in which a BBU 101 and an RU 102 are included is used for description. The BBU 101 and the RU 102 may be physically disposed together, or may be physically separated, that is, in a distributed network device. An interface between the BBU 101 and the RU 102 may be an optical interface, and data may be transmitted between the BBU 101 and the RU 102 through an optical fiber.

The BBU 101 is mainly configured to: perform baseband signal processing, control a network device, and the like. The baseband signal processing includes channel coding, multiplexing, modulation, spectrum spreading, performing amplitude limiting on a power of a carrier, canceling an amplitude limitation performed on a power, and the like. The BBU 101 may be configured to: detect load of a to-be-detected cell; if the load of the to-be-detected cell is less than a first threshold, determine a first allowable power of a carrier corresponding to the to-be-detected cell; and send the first allowable power to a radio frequency unit RU, to indicate the RU to adjust, based on the first allowable power, a bias voltage of a power amplifier PA corresponding to the carrier corresponding to the to-be-detected cell. For example, the BBU 101 may include one or more boards. A plurality of boards may jointly support a radio access network (for example, a long term evolution (LTE) network) in a single access standard, or may separately support radio access networks in different access standards.

The RU 102 is mainly configured to send and receive a radio frequency signal, and perform conversion between a radio frequency signal and a baseband signal. An operating principle of the RU is to perform frequency translation, filtering, and amplification on a baseband signal in a downlink manner, and send the baseband signal to an antenna feeder by transmitting and filtering the baseband signal. The RU 102 may be configured to: receive the at least one first allowable power; determine a target bias voltage of the PA based on the at least one first allowable power; and adjust a bias voltage of the PA to the target bias voltage. The first allowable power is a current allowable power of the carrier corresponding to the to-be-detected cell when the load of the to-be-detected cell is less than the first threshold. The first allowable power is less than a maximum allowable power of the carrier corresponding to the to-be-detected cell. The RU 102 includes at least one PA, and the PA is mainly configured to amplify a radio frequency signal. When amplifying the radio frequency signal, the PA has a corresponding power indicator. The power indicator may usually include an output power and a maximum allowable power. The output power may also be referred to as a rated output power, and may be understood as a maximum value of a power that is output when harmonic distortion varies within a standard range and the PA operates safely for a long time. The maximum allowable power refers to a "peak" output power of the power amplifier, and may be understood as a maximum value of an output power that can be tolerated by the PA when the PA receives an electric signal and it is ensured that the PA is not damaged.

Figure 1A:
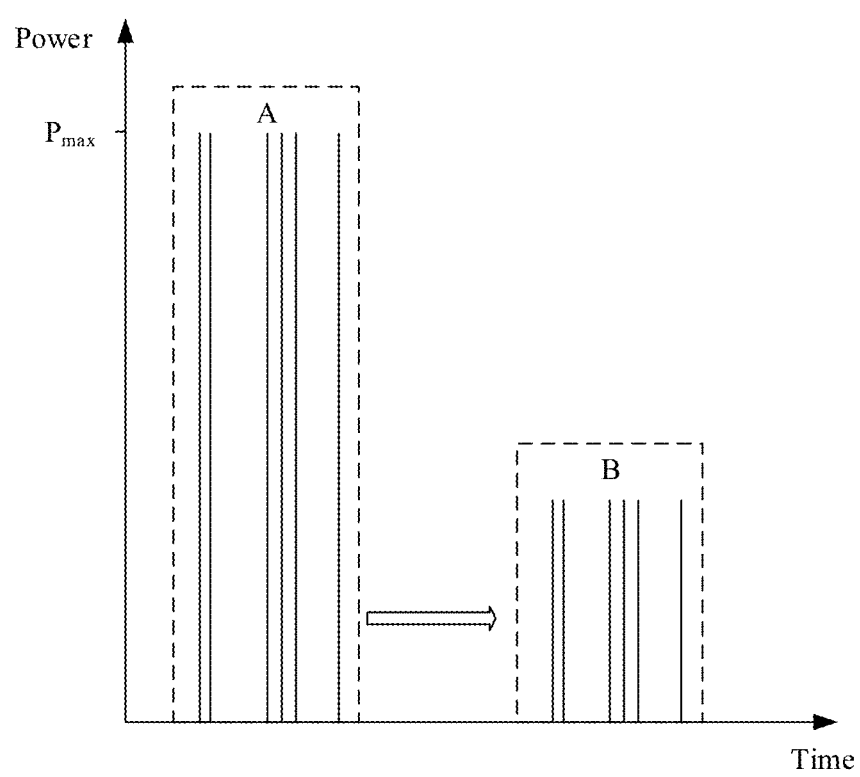
FIG. 1a is a schematic diagram of a principle of adjusting a bias voltage based on power amplitude limiting according to this application.

Based on the system shown in FIG. 1, FIG. 1a is a schematic diagram of a principle of adjusting a bias voltage based on power amplitude limiting according to this application. As shown in a part A in FIG. 1a, all services are processed at a maximum allowable power, and there is a relatively small time interval between two adjacent maximum allowable powers. The foregoing scenario may also be referred to as a scenario in which power peaks frequently occur. In the scenario in which power peaks frequently occur, because there is a relatively small time interval between two maximum allowable powers, there is usually no time for an RU to adjust a bias voltage of a PA before the RU processes a service at a next maximum allowable power. Based on a part B in FIG. 1a, in this application, when performing scheduling, the BBU may perform amplitude limiting on a maximum allowable power of a carrier corresponding to a to-be-detected cell. To be specific, the BBU reduces the maximum allowable power corresponding to the carrier (which may also be understood as reducing a power of processing a service), so that the bias voltage of the PA in the RU needs to be reduced. In this way, the RU adjusts the bias voltage of the PA.

Figure 2:
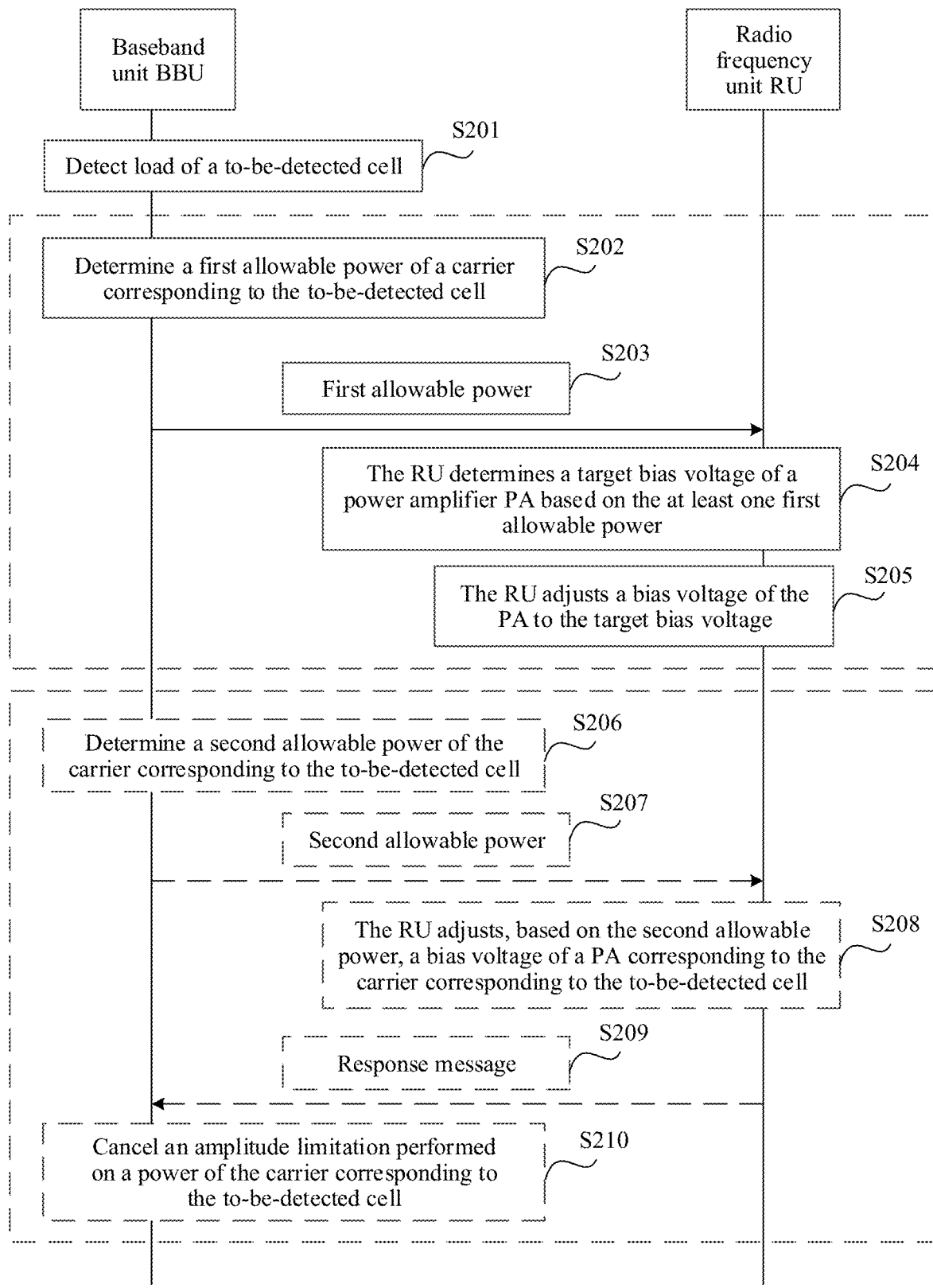
FIG. 2 is a schematic flowchart of a power consumption control method according to this application.

Based on the foregoing content, FIG. 2 is a schematic flowchart of a power consumption control method according to this application. A BBU in FIG. 2 may be the BBU 101 in FIG. 1, and an RU may be the RU 102 in FIG. 1. As shown in FIG. 2, the method includes the following steps.

Step S201. The BBU detects load of a to-be-detected cell.

Herein, the load of the to-be-detected cell may refer to downlink load of the to-be-detected cell. For example, in an LTE system, the downlink load of the to-be-detected cell may be a ratio of an actual physical resource block (PRB) of the to-be-detected cell to a maximum available PRB. In a universal mobile telecommunications system (UMTS) system, the downlink load of the to-be-detected cell may be a ratio of an actual power of the to-be-detected cell to a maximum allowable power. In 5G new radio (NR), the downlink load of the to-be-detected cell may be a ratio of an actual physical resource block (PRB) of the to-be-detected cell to a maximum available PRB, or may be a ratio of an actual power of the to-be-detected cell to a maximum allowable power. The to-be-detected cell may be all cells covered by the RU, or may be a cell that satisfies a condition in cells covered by the RU.

In an embodiment, the BBU may periodically detect the load of the to-be-detected cell. A detection periodicity needs to be greater than duration required by the RU to adjust a bias voltage. This helps prevent a PA from adjusting another bias voltage before the PA completes adjusting the bias voltage.

After step S201, if the load of the to-be-detected cell is less than a first threshold, step S202 to step S205 are performed; and if the load of the to-be-detected cell is greater than a second threshold, step S206 to step S210 are performed.

Step S202. If the load of the to-be-detected cell is less than the first threshold, the BBU determines a first allowable power of a carrier corresponding to the to-be-detected cell.

The first allowable power is less than a maximum allowable power of the carrier corresponding to the to-be-detected cell. The maximum allowable power of the carrier corresponding to the to-be-detected cell is also referred to as a configured power of the carrier corresponding to the to-be-detected cell. The first allowable power is a current allowable power of the carrier corresponding to the to-be-detected cell. If the load of the to-be-detected cell is less than the first threshold, it indicates that the load of the to-be-detected cell is relatively low. Power amplitude limiting is performed on the to-be-detected cell whose load is relatively low, thereby helping prevent a service of the to-be-detected cell from being affected by power amplitude limiting.

Herein, the first threshold may be preset, and a specific value may be determined based on experience.

Herein, after determining the first allowable power of the carrier corresponding to the to-be-detected cell, the BBU performs power amplitude limiting on the to-be-detected cell. It may also be understood as that the BBU limits the maximum allowable power of the to-be-detected cell to the first allowable power, that is, limits the configured power of the to-be-detected cell to the first allowable power. In this way, the to-be-detected cell processes a service at the first allowable power. Optionally, a downlink scheduling module of the BBU may perform amplitude limiting on the maximum allowable power of the to-be-detected cell.

In an embodiment, the BBU may determine, based on the maximum allowable power of the carrier corresponding to the to-be-detected cell and a preset amplitude limiting percentage parameter, the first allowable power of the carrier corresponding to the to-be-detected cell. The amplitude limiting percentage parameter is a positive number less than or equal to 1. For example, the first allowable power of the carrier corresponding to the to-be-detected cell may be a product of the maximum allowable power and the preset amplitude limiting percentage parameter.

Herein, the RU may include a carrier in only one mode (which is also referred to as a single-mode scenario). For example, the RU may include a carrier only in UMTS mode, or may include a carrier only in LTE mode, or may include a carrier only in 5G NR mode. The carrier in one mode may be a single carrier, or may be a plurality of carriers. In another possible implementation, the RU may include carriers in a plurality modes (which is also referred to as a multi-mode scenario). For example, a carrier in UMTS mode and a carrier in LTE mode may both exist. Alternatively, a carrier in UMTS mode and a carrier in 5G NR mode may both exist. Alternatively, a carrier in LTE mode and a carrier in 5G NR mode may both exist. Alternatively, a carrier in UMTS mode, a carrier in LTE mode, and a carrier in 5G NR mode may all exist. Optionally, the BBU needs to determine first allowable powers of the carriers that correspond to to-be-detected cells and in different modes. For example, if the RU includes a carrier 1 in LTE mode and a carrier 2 in UMTS mode, the BBU needs a first allowable power of the carrier 1 in LTE mode and a first allowable power of the carrier 2 in UMTS mode. For another example, the RU includes a carrier 1 in LTE mode, a carrier 2 in UMTS mode, and a carrier 3 in 5G NR mode, the BBU needs a first allowable power of the carrier 1 in LTE mode, a first allowable power of the carrier 2 in UMTS mode, and a first allowable power of the carrier 3 in 5G NR mode.

Step S203. The BBU sends the first allowable power to the RU. Correspondingly, the RU may receive the first allowable power.

In an embodiment, the BBU sends the first allowable power to the RU through an interface between the BBU and the RU. During specific implementation, the first allowable power and an identifier of the corresponding carrier may be sent to the RU. In addition, when it is simultaneously detected that load of a plurality of cells is less than the first threshold, both identifiers of carriers corresponding to the cells and first allowable powers corresponding to the cells may be sent to the RU.

In an embodiment, if the BBU determines that power amplitude limiting needs to be performed on a power of a carrier corresponding to each cell covered by the RU, the BBU may determine a first allowable power of the carrier corresponding to each cell, and send the first allowable power of each carrier to the RU.

In another possible implementation, if the BBU determines that power amplitude limiting needs to be performed on carriers corresponding to a part of cells covered by the RU, the BBU determines first allowable powers of the carriers, corresponding to the cells, on which power amplitude limiting needs to be performed, and sends, to the RU, the first allowable powers of the carriers on which power amplitude limiting needs to be performed.

In another possible implementation, if the BBU determines that power amplitude limiting needs to be performed on carriers corresponding to a part of cells covered by the RU, the BBU determines first allowable powers of the carriers, corresponding to the cells, on which power amplitude limiting needs to be performed, and sends, to the RU, the first allowable powers of the carriers on which power amplitude limiting needs to be performed and a maximum allowable power of a first carrier. The first carrier is a carrier on which power amplitude limiting does not need to be performed.

For example, it is assumed that the RU covers three cells, the three cells are a cell a (where a carrier corresponding to the cell a is referred to as a carrier 1), a cell b (where a carrier corresponding to the cell b is referred to as a carrier 2), and a cell c (where a carrier corresponding to the cell c is referred to as a carrier 3). In an example, when the BBU determines that power amplitude limiting needs to be performed on the cell a and the cell b, the BBU determines that a first allowable power of the carrier 1 corresponding to the cell a is $P_1$, a first allowable power of the carrier 2 corresponding to the cell b is $P_2$, and a first allowable power of the carrier 3 corresponding to the cell c is $P_3$. $P_1$, $P_2$, and $P_3$ may be the same, or may be different. First allowable powers sent by the BBU to the RU are $P_1$, $P_2$, and $P_3$. In another example, when the BBU determines that power amplitude limiting needs to be performed on the cell a and the cell b, the BBU determines that a first allowable power of the carrier 1 corresponding to the cell a is $P_1$, and a first allowable power of the carrier 2 corresponding to the cell b is $P_2$. $P_1$ and $P_2$ may be the same, or may be different. First allowable powers sent by the BBU to the RU are $P_1$ and $P_2$. In another example, when the BBU determines that power amplitude limiting needs to be performed on the cell a and the cell b, the BBU determines that a first allowable power of the carrier 1 is $P_1$, and a first allowable power of the carrier 2 is $P_2$. $P_1$ and $P_2$ may be the same, or may be different. First allowable powers sent by the BBU to the RU are $P_1$ and $P_2$. The BBU sends a maximum allowable power of the carrier 3 corresponding to the cell c.

Step S204. The RU determines a target bias voltage of a PA based on the at least one first allowable power.

In an embodiment, one PA may correspond to one or more carriers. If amplitude limiting is performed on all carriers in one PA in the RU, that is, the BBU determines that current maximum allowable powers of all the carriers in the PA in the RU are first allowable powers, a target maximum allowable power of the PA is a sum of the first allowable powers of the carriers in the PA. If amplitude limiting is performed on a part of carriers in one PA in the RU, a target maximum allowable power of the PA is a sum of a maximum allowable power of a first carrier and the first allowable power of the carrier corresponding to the to-be-detected cell. The first carrier is a carrier on which power amplitude limiting does not need to be performed. Specifically, the first carrier is a carrier on which power amplitude limiting does not need to be performed in the PA. Further, a bias voltage, corresponding to the target maximum allowable power of the PA, of the PA, namely, the target bias voltage of the PA, is determined based on a table for drain voltage adjustment. The table for drain voltage adjustment includes a mapping relationship between the target maximum allowable power and the bias voltage.

For example, if three cells are configured on the RU, the three cells are respectively a cell a (where a carrier corresponding to the cell a is referred to as a carrier 1), a cell b (where a carrier corresponding to the cell b is referred to as a carrier 2), and a cell c (where a carrier corresponding to the cell c is referred to as a carrier 3). The RU includes a $PA_1$ and a $PA_2$. The cell a occupies a power of the $PA_1$, the cell b occupies the power of the $PA_1$, and the cell c occupies a power of the $PA_2$. In an example, the BBU determines that power amplitude limiting needs to be performed on the cell a, the cell b, and the cell c. The BBU determines that a first allowable power of the carrier 1 corresponding to the cell a is $P_1$, a first allowable power of the carrier 2 corresponding to the cell b is $P_2$, and a first allowable power of the carrier 3 corresponding to the cell c is $P_3$. In this case, a target maximum allowable power of the $PA_1$ is $P_1+P_2$, and a target maximum allowable power of the $PA_2$ is $P_3$. In another example, if the BBU determines that power amplitude limiting needs to be performed on the cell a and the cell c, the BBU determines that a first allowable power of the carrier 1 corresponding to the cell a is $P_1$ and a first allowable power of the carrier 3 corresponding to the cell c is $P_3$. In this case, a target maximum allowable power of the $PA_1$ is First allowable power $P_1$ of the carrier 1+Maximum allowable power of the carrier 2, and a target maximum allowable power of the $PA_2$ is the first allowable power $P_3$ of the carrier 3.

Herein, if a cell occupies powers of a plurality of PAs (which may also be understood as that a cell is carried by using different carriers in different PAs), first allowable powers of the carriers, corresponding to the cell, in the PAs need to be determined.

For example, if a maximum allowable power of a carrier corresponding to a cell A is a power occupying the $PA_1$ and the $PA_2$, if power amplitude limiting needs to be performed on the carrier corresponding to the cell, the BBU needs to separately determine a first allowable power occupying the $PA_1$ and a first allowable power occupying the $PA_2$.

Step S205. The RU adjusts a bias voltage of the PA to the target bias voltage. To be specific, the bias voltage at which the PA currently operates is adjusted to the target bias voltage determined and obtained in the foregoing step, so that the PA operates at the target bias voltage.

It can be learned from the step S201 to the step S205 that, when the BBU detects that the load of the to-be-detected cell is less than the first threshold, it indicates that the load of the to-be-detected cell is relatively low. In this case, the BBU determines that the maximum allowable power of the carrier corresponding to the to-be-detected cell may be reduced. The BBU reduces the current maximum allowable power of the carrier corresponding to the to-be-detected cell to the first allowable power, and sends the first allowable power to the RU. Because the first allowable power is less than the maximum allowable power, the RU may reduce, based on the first allowable power, the bias voltage of the PA corresponding to the carrier corresponding to the to-be-detected cell. In addition, because power consumption of the PA is positively correlated with the bias voltage of the PA, that the bias voltage of the PA is reduced helps reduce the power consumption of the PA, thereby further reducing power consumption of the RU. Further, only when the load of the to-be-detected cell is relatively low, amplitude limiting is performed on the power of the carrier corresponding to the to-be-detected cell, so that it is ensured that a basic service capability of the cell is not obviously affected by the amplitude limiting performed on the power.

Step S206. If the load of the to-be-detected cell is greater than the second threshold, the BBU determines a second allowable power of the carrier corresponding to the to-be-detected cell. The second allowable power is equal to the maximum allowable power of the carrier corresponding to the to-be-detected cell, and the second threshold is greater than the first threshold.

Herein, the second threshold is preset, and a specific value may be determined based on experience.

In an embodiment, if the load of the to-be-detected cell is higher than the second threshold, it indicates that the current load of the cell is relatively high, and an amplitude limitation performed on the power of the carrier corresponding to the to-be-detected cell needs to be canceled, to satisfy a service requirement of the to-be-detected cell as much as possible.

Step S207. The BBU sends the second allowable power to the RU. For an embodiment of the step S207, refer to the foregoing step S203. Details are not described herein again. Correspondingly, the RU receives the at least one second allowable power sent by the BBU.

Step S208. The RU adjusts, based on the second allowable power, a bias voltage of a PA corresponding to the carrier corresponding to the to-be-detected cell. For an embodiment of the step S208, refer to the foregoing step S204. Details are not described herein again.

Step S209. The RU sends a response message to the BBU. The response message is used to indicate that the RU completes adjusting the bias voltage. Correspondingly, the BBU receives the response message sent by the RU.

In an embodiment, after completing adjusting the bias voltage, the RU sends, to the BBU, the response message that the bias voltage is adjusted. During specific implementation, the response message may be sent to the BBU through an interface between the BBU and the RU.

Step S210. After receiving the response message from the RU, the BBU cancels an amplitude limitation performed on the power of the carrier corresponding to the to-be-detected cell. The response message is sent by the RU after the RU completes adjusting the bias voltage.

In an embodiment, that the BBU cancels the amplitude limitation performed on the power of the to-be-detected cell may also be understood as that the to-be-detected cell processes a service at the maximum allowable power. The maximum allowable power is a configured power.

It can be learned from the foregoing step S206 to step S210 that, when the BBU detects that the load of the to-be-detected cell is higher than the second threshold, it indicates that the current load of the to-be-detected cell is relatively high, and a relatively large quantity of services need to be processed. In this case, the BBU determines the second allowable power of the carrier corresponding to the to-be-detected cell, namely, the maximum allowable power of the carrier corresponding to the to-be-detected cell. Then the BBU sends, to the RU, the second allowable power of the carrier corresponding to the to-be-detected cell, and the RU adjusts, based on the second allowable power, the bias voltage of the PA corresponding to the carrier corresponding to the to-be-detected cell, so that a service of the to-be-detected cell can be sent at the maximum allowable power of the to-be-detected cell, thereby satisfying a service requirement of the to-be-detected cell as much as possible. In addition, only after receiving the response message from the RU, the BBU cancels the amplitude limitation performed on the power of the carrier corresponding to the to-be-detected cell, so that the BBU can send, to the PA, a baseband signal with a relatively high power after the PA in the RU operates at the maximum allowable power. This helps prevent the PA from operating, due to a sudden power peak, in a non-linear area, and helps prevent a decline in a radio frequency specification (for example, an error vector magnitude (EVM) or an adjacent channel leakage ratio (ACLR)) of the RU.

After the step S205, the RU may further sends the response message to the baseband unit BBU. The response message is used to indicate that the RU completes adjusting the bias voltage.

Figure 3A:
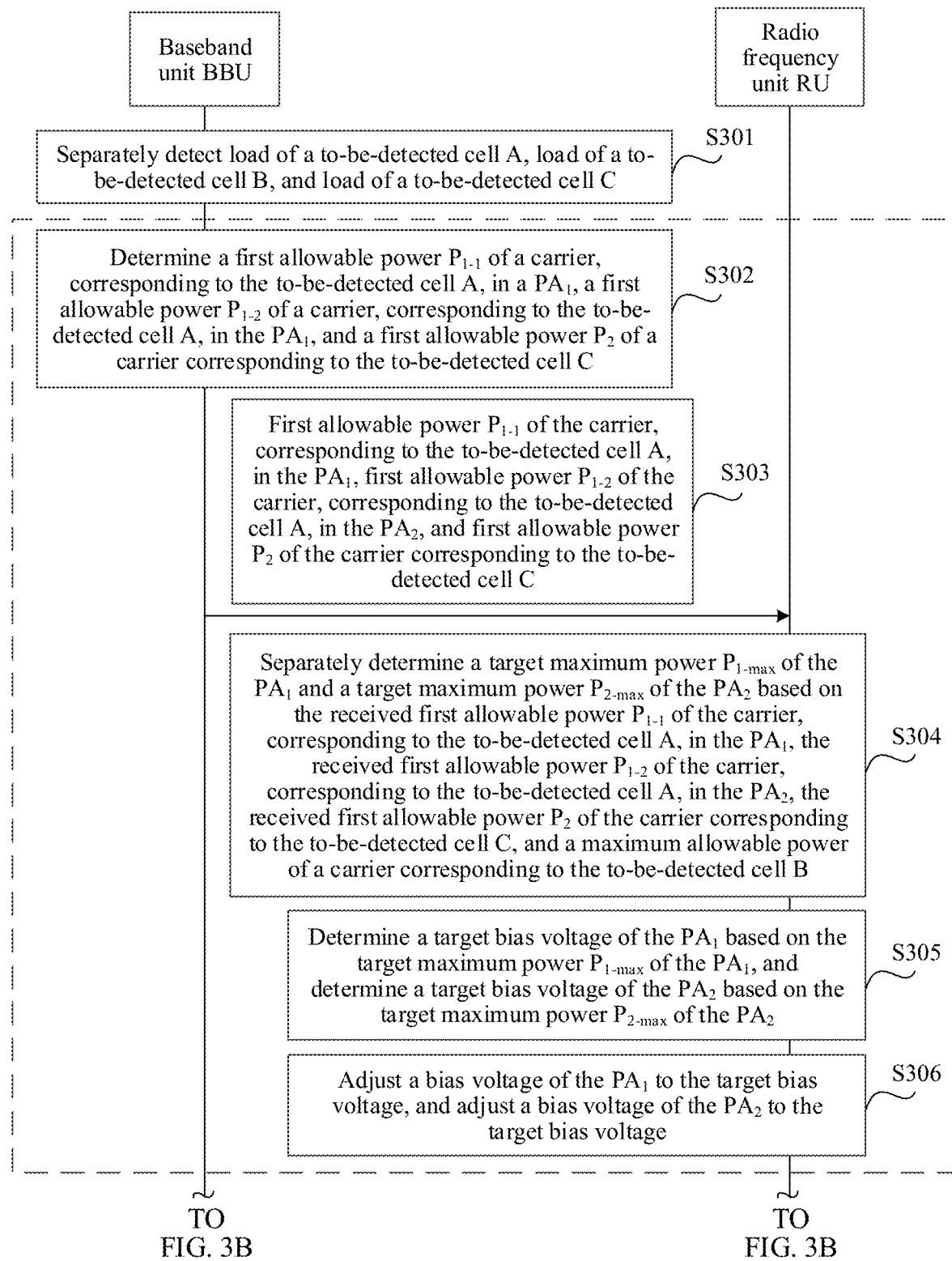
FIG. 3A and FIG. 3B are a schematic flowchart of another power consumption control method according to this application.
Figure 3B:
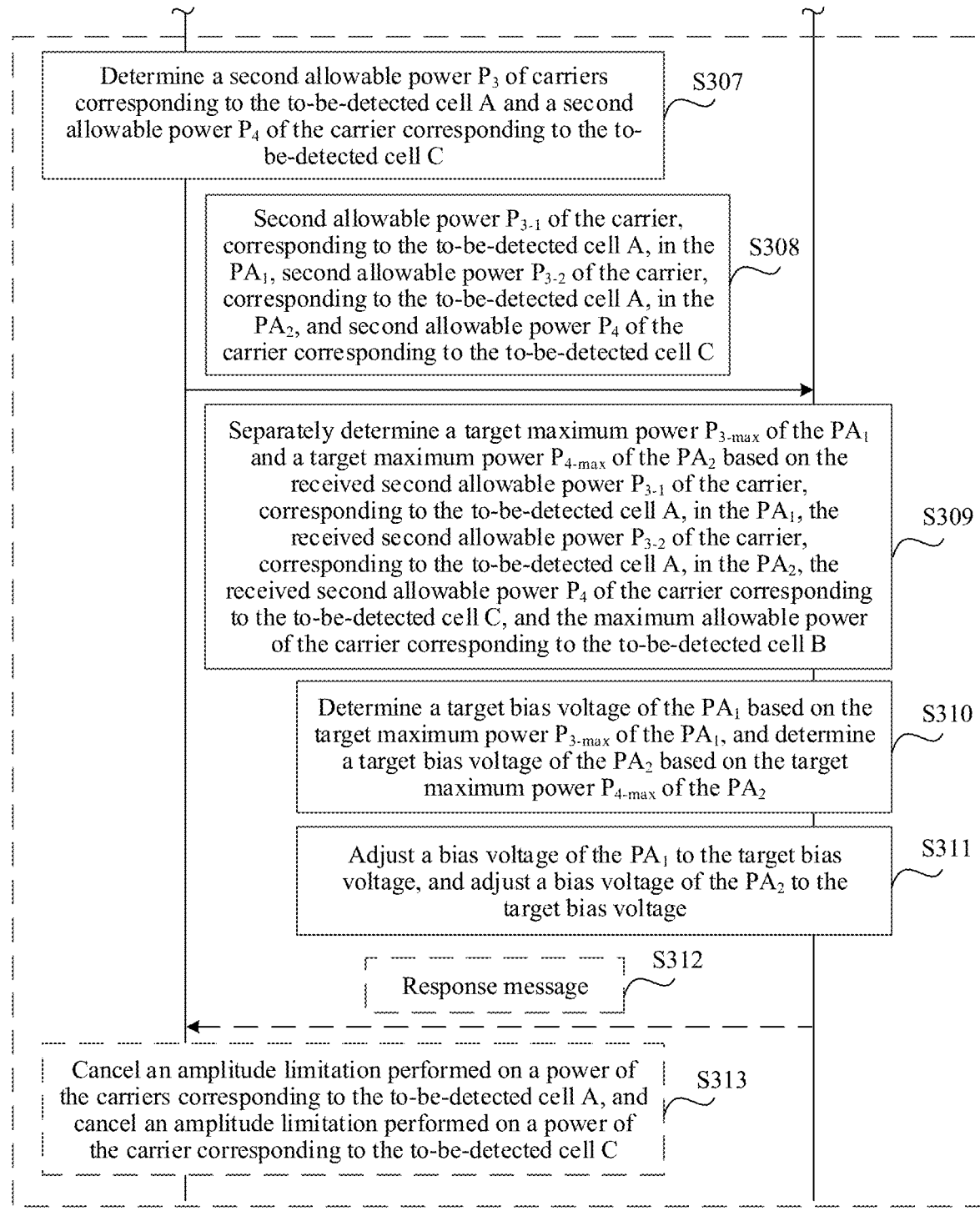

To describe the foregoing method procedure more clearly, the following further describes the power consumption control method provided in this application with reference to specific examples. With reference to FIG. 1 and FIG. 2, an example in which an RU covers a cell A, a cell B, and a cell C, where the cell A, the cell B, and the cell C are all to-be-detected cells, and the RU includes a $PA_1$ and a $PA_2$ is used for description. It is assumed that both maximum allowable powers of the $PA_1$ and the $PA_2$ are 40 w. A maximum allowable power of carriers corresponding to the cell A is 2*20 w, which is specifically 20 w of the $PA_1$ and 20 w of the $PA_2$ (where the cell A occupies two PAs, which may also be understood as that the cell A is carried by one carrier on each of the two PAs). A maximum allowable power of a carrier corresponding to cell B is 20 w, which is specifically 20 w of the $PA_1$. A maximum allowable power of a carrier corresponding to the cell C is 20 w, which is specifically 20 w of the $PA_2$. A preset amplitude limiting percentage parameter is 0.5. FIG. 3A and FIG. 3B are a schematic flowchart of another power consumption control method according to this application. The method includes the following steps.

Step S301. A BBU separately detects load of the to-be-detected cell A, load of the to-be-detected cell B, and load of the to-be-detected cell C.

Step S302. If both the load of the to-be-detected cell A and the load of the to-be-detected cell C is less than a first threshold, the BBU determines a first allowable power $P_{1-1}$ of a carrier, corresponding to the to-be-detected cell A, in the $PA_1$, a first allowable power $P_{1-2}$ of a carrier, corresponding to the to-be-detected cell A, in the $PA_1$, and a first allowable power $P_2$ of the carrier corresponding to the to-be-detected cell C.

The BBU performs amplitude limiting on the to-be-detected cell A based on $P_1$, and performs amplitude limiting on the to-be-detected cell C based on $P_2$. First allowable power $P_{1-1}$ of the carrier, corresponding to the to-be-detected cell A, in the $PA_1$=Maximum allowable power of the carrier corresponding to the to-be-detected cell A*Preset amplitude limiting percentage parameter=20 w*0.5=10 w. First allowable power $P_{1-2}$ of the carrier, corresponding to the to-be-detected cell A, in the $PA_2$=Maximum allowable power of the carrier corresponding to the to-be-detected cell A*Preset amplitude limiting percentage parameter=20 w*0.5=10 w. First allowable power $P_2$ of the carrier corresponding to the to-be-detected cell C=Maximum allowable power of the carrier corresponding to the to-be-detected cell C*Preset amplitude limiting percentage parameter=20 w*0.5=10 w.

Step S303. The BBU sends, to the radio frequency unit RU, the first allowable power $P_{1-1}$ of the carrier, corresponding to the to-be-detected cell A, in the $PA_1$, the first allowable power $P_{1-2}$ of the carrier, corresponding to the to-be-detected cell A, in the $PA_2$, and the first allowable power $P_2$ of the carrier corresponding to the to-be-detected cell C.

Step S304: The RU separately determines a target maximum power $P_{1-max}$ of the $PA_1$ and a target maximum power $P_{2-max}$ of the $PA_2$ based on the received first allowable power $P_{1-1}$ of the carrier, corresponding to the to-be-detected cell A, in the $PA_1$, the received first allowable power $P_{1-2}$ of the carrier, corresponding to the to-be-detected cell A, in the $PA_2$, the received first allowable power $P_2$ of the carrier corresponding to the to-be-detected cell C, and the maximum allowable power of the carrier corresponding to the to-be-detected cell B.

Herein, Target maximum power $P_{1-max}$ of the $PA_1$=First allowable power, occupying the $PA_1$, of the first allowable power $P_1$ of the carrier, corresponding to the to-be-detected cell A, in the $PA_1$+Maximum allowable power of the carrier corresponding to the to-be-detected cell B=10 w+20 w=30 w. Target maximum power $P_{2-max}$ of the $PA_2$=First allowable power, occupying the $PA_2$, of the first allowable power $P_1$ of the carrier, corresponding to the to-be-detected cell A, in the $PA_2$+First allowable power $P_2$ of the carrier corresponding to the to-be-detected cell C=10 w+10 w=20 w.

Step S305: The RU determines a target bias voltage of the $PA_1$ based on the target maximum power $P_{1-max}$ of the $PA_1$, and determines a target bias voltage of the $PA_2$ based on the target maximum power $P_{2-max}$ of the $PA_2$.

Herein, the target bias voltage corresponding to the target maximum power $P_{1-max}$ of the $PA_1$ and the target bias voltage corresponding to the target maximum power $P_{2-max}$ of the $PA_2$ may be determined by querying a table for drain voltage adjustment.

Step S306. The RU adjusts a bias voltage of the $PA_1$ to the target bias voltage, and adjusts a bias voltage of the $PA_2$ to the target bias voltage.

Step S307. If both the load of the to-be-detected cell A and the load of the to-be-detected cell C is greater than a second threshold, the BBU determines a second allowable power $P_3$ of the carriers corresponding to the to-be-detected cell A and a second allowable power $P_4$ of the carrier corresponding to the to-be-detected cell C.

Second allowable power $P_3$ of the carriers corresponding to the to-be-detected cell A=Maximum allowable power of the carriers corresponding to the to-be-detected cell A=2*20 w. Second allowable power $P_4$ of the carrier corresponding to the to-be-detected cell C=Maximum allowable power of the carrier corresponding to the to-be-detected cell C=20 w.

Step S308. The BBU sends, to the radio frequency unit RU, a second allowable power $P_{3-1}$ of the carrier, corresponding to the to-be-detected cell A, in the $PA_1$, a second allowable power $P_{3-2}$ of the carrier, corresponding to the to-be-detected cell A, in the $PA_2$, and the second allowable power $P_4$ of the carrier corresponding to the to-be-detected cell C.

Step S309: The RU separately determines a target maximum power $P_{3-max}$ of the $PA_1$ and a target maximum power $P_{4-max}$ of the $PA_2$ based on the received second allowable power $P_{3-1}$ of the carrier, corresponding to the to-be-detected cell A, in the $PA_1$, the received second allowable power $P_{3-2}$ of the carrier, corresponding to the to-be-detected cell A, in the $PA_2$, the received second allowable power $P_4$ of the carrier corresponding to the to-be-detected cell C, and the maximum allowable power of the carrier corresponding to the to-be-detected cell B.

Target maximum power $P_{3-max}$ of the $PA_1$=Second allowable power $P_{3-1}$ of the carrier, corresponding to the to-be-detected cell A, in the $PA_1$+Maximum allowable power of the carrier corresponding to the to-be-detected cell B=20 w+20 w=40 w. Target maximum power $P_{4-max}$ of the $PA_1$=Second allowable power $P_{3-2}$ of the carrier, corresponding to the to-be-detected cell A, in the $PA_1$+Second allowable power $P_2$ of the carrier corresponding to the to-be-detected cell C=20 w+20 w=40 w.

Step S310: The RU determines a target bias voltage of the $PA_1$ based on the target maximum power $P_{3-max}$ of the $PA_1$, and determines a target bias voltage of the $PA_2$ based on the target maximum power $P_{4-max}$ of the $PA_2$.

During specific implementation, the target bias voltages of the $PA_1$ and the $PA_2$ may be determined by querying a table for drain voltage adjustment.

Step S311. The RU adjusts a bias voltage of the $PA_1$ to the target bias voltage, and adjusts a bias voltage of the $PA_2$ to the target bias voltage.

To be specific, the bias voltage at which the PA currently operates is adjusted to the target bias voltage determined and obtained in the foregoing step, so that the PA operates at the target bias voltage.

Step S312. The RU sends a response message to the BBU. The response message is used to indicate that the RU completes adjusting the bias voltage.

Correspondingly, the BBU receives the response message sent by the RU.

Step S313. After receiving the response message from the RU, the BBU cancels an amplitude limitation performed on a power of the carriers corresponding to the to-be-detected cell A, and cancels an amplitude limitation performed on a power of the carrier corresponding to the to-be-detected cell C.

Herein, the BBU determines that the power of the carriers corresponding to the to-be-detected cell A is the maximum allowable power of the carriers corresponding to the to-be-detected cell A, and the power of the carrier corresponding to the to-be-detected cell B is also the maximum allowable power of the carrier corresponding to the to-be-detected cell B.

It can be learned from FIG. 3A and FIG. 3B that, when the load of the to-be-detected cell is less than the first threshold, amplitude limiting is performed on the to-be-detected cell; or when the load of the to-be-detected cell is greater than the second threshold, the amplitude limitation performed on the to-be-detected cell is canceled. In this way, the maximum allowable power of the PA in the RU can always match a service requirement of the to-be-detected cell in the BBU. Further, amplitude limiting is performed on the maximum allowable power on a BBU side, so that it can be ensured that a current maximum allowable power of a baseband signal on the BBU side is less than or equal to a current maximum output capability of the PA on an RU side.

Figure 4:
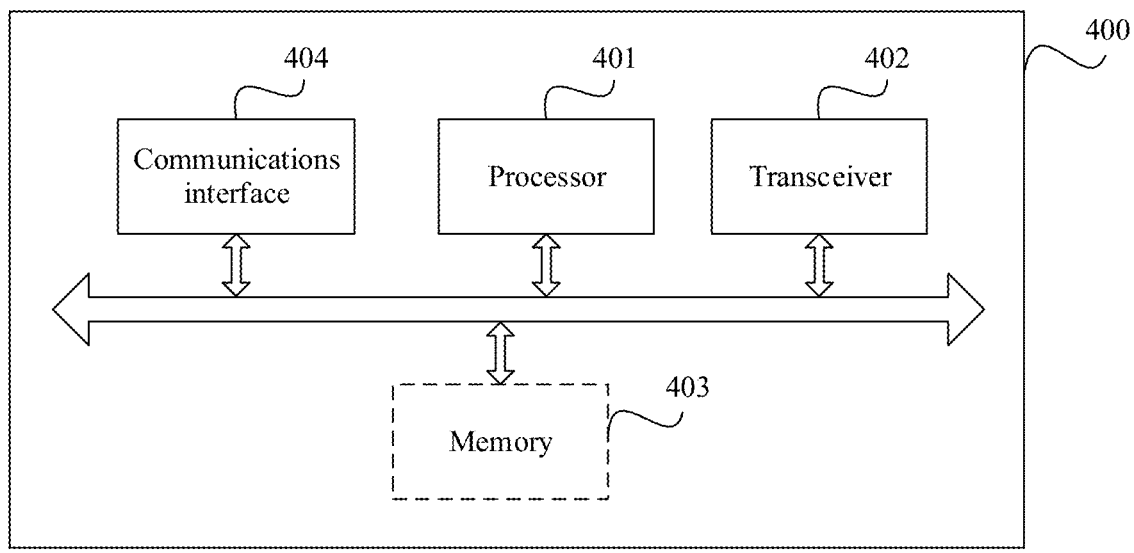
FIG. 4 is a schematic structural diagram of a BBU according to this application.

Based on the foregoing content and the same concept, this application provides a BBU that is configured to perform any solution on the BBU side in the foregoing method. FIG. 4 is a schematic structural diagram of a BBU according to this application. As shown in FIG. 4, the BBU 400 includes a processor 401, a transceiver 402, and a communications interface 404. Optionally, the BBU 400 further includes a memory 403. In this example, the BBU 400 may be the BBU 101 in FIG. 1, and may execute the solution correspondingly executed on the BBU side in FIG. 2 or FIG. 3A and FIG. 3B.

The memory 403 is configured to store a necessary instruction and data. The processor 401 is configured to control the BBU 400 to perform a necessary action, for example, configured to control the BBU to perform the method performed by the BBU in any one of the foregoing embodiments. The processor 401 may be configured to: read the computer instruction in the memory 403, to detect load of a to-be-detected cell; and if the load of the to-be-detected cell is less than a first threshold, determine a first allowable power of a carrier corresponding to the to-be-detected cell. The first allowable power is less than a maximum allowable power of the carrier corresponding to the to-be-detected cell. The transceiver 402 is configured to send the first allowable power to an RU, to indicate the RU to adjust, based on the first allowable power, a bias voltage of a power amplifier PA corresponding to the carrier corresponding to the to-be-detected cell.

In an embodiment, the processor 401 is further configured to: if the load of the to-be-detected cell is greater than a second threshold, determine a second allowable power of the carrier corresponding to the to-be-detected cell, where the second allowable power is equal to the maximum allowable power of the carrier corresponding to the to-be-detected cell, and the second threshold is greater than the first threshold; and after receiving a response message from the RU, cancel an amplitude limitation performed on a power of the carrier corresponding to the to-be-detected cell. The response message is sent by the RU after the RU completes adjusting the bias voltage. The transceiver 402 is further configured to send the second allowable power to the RU, to indicate the RU to adjust, based on the second allowable power, the bias voltage of the PA corresponding to the carrier corresponding to the to-be-detected cell.

In an embodiment, the processor 401 is specifically configured to determine, based on the maximum allowable power of the carrier corresponding to the to-be-detected cell and a preset amplitude limiting percentage parameter, the first allowable power of the carrier corresponding to the to-be-detected cell. The amplitude limiting percentage parameter is a positive number less than or equal to 1.

Figure 5:
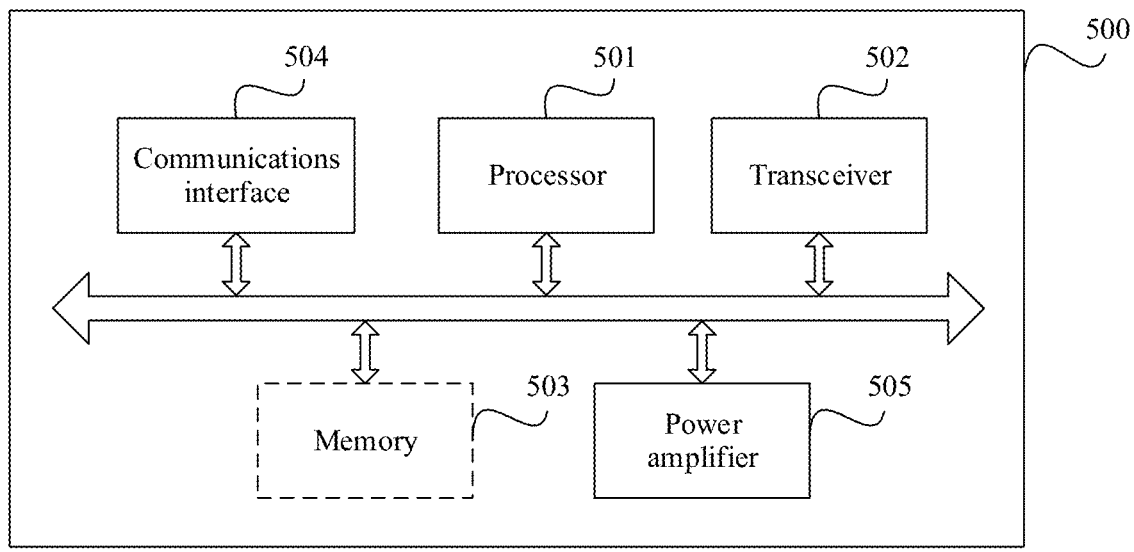
FIG. 5 is a schematic structural diagram of an RU according to this application.

Based on the foregoing content and the same concept, this application provides an RU that is configured to perform any solution on the RU side in the foregoing method. FIG. 5 is a schematic structural diagram of an RU according to this application. As shown in FIG. 5, the RU 500 includes a processor 501, a transceiver 502, a communications interface 504, and a power amplifier 505. Optionally, the RU 500 further includes a memory 503. The RU 500 may be referred to as a transceiver unit, a transceiver, a transceiver circuit, a transceiver, or the like. In this example, the RU 500 may be the RU 102 in FIG. 1, and may execute the solution correspondingly executed by the RU in FIG. 2 or FIG. 3A and FIG. 3B.

The transceiver 502 in the RU 500 may be configured to receive at least one first allowable power. The first allowable power is a current allowable power of a carrier corresponding to a to-be-detected cell when load of the to-be-detected cell is less than a first threshold. The first allowable power is less than a maximum allowable power of the carrier corresponding to the to-be-detected cell. The processor 501 may be configured to: read a computer instruction in the memory 503, to determine a target bias voltage of the power amplifier PA 505 based on the at least one first allowable power, and adjust a bias voltage of the PA 505 to the target bias voltage.

In an embodiment, the transceiver 502 is further configured to send a response message to a BBU. The response message is used to indicate that the RU completes adjusting the bias voltage.

In an embodiment, the processor 501 is specifically configured to: determine a target maximum allowable power of the PA 505, and determine the target bias voltage corresponding to the target maximum allowable power. The target maximum allowable power is a sum of first allowable powers of carriers in the PA 505; or the target maximum allowable power is a sum of a maximum allowable power of a first carrier in the PA 505 and the first allowable power of the carrier corresponding to the to-be-detected cell. The first carrier is a carrier on which power amplitude limiting does not need to be performed.

Figure 6:
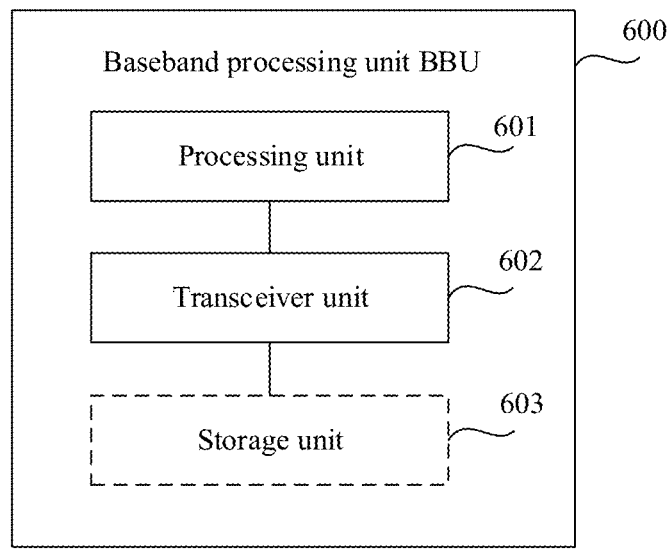
FIG. 6 is a schematic structural diagram of a BBU according to this application.

Based on the same concept, this application provides a BBU that is configured to perform any solution on the BBU side in the foregoing method. FIG. 6 is a schematic structural diagram of a BBU according to this application. As shown in FIG. 6, the BBU 600 includes a processing unit 601 and a transceiver unit 602. Optionally, the BBU 600 further includes a storage unit 603. In this example, the BBU 600 may be the BBU 101 in FIG. 1, and may execute the solution correspondingly executed on the BBU side in FIG. 2 or FIG. 3A and FIG. 3B.

It should be understood that division into units of the foregoing BBU is merely logical function division. During actual implementation, all or some of the units may be integrated into a physical entity, or may be physically separated. In this application, the processing unit 601 in FIG. 6 may be implemented by the processor 401 in FIG. 4, and the transceiver unit 602 in FIG. 6 may be implemented by the transceiver 402 in FIG. 4. In other words, in this application, the processing unit 601 may perform the solution performed by the processor 501 in FIG. 4, and the transceiver unit 602 may perform the solution performed by the transceiver 402 in FIG. 4. For other content, refer to the foregoing content. Details are not described herein again.

For related content of the foregoing optional implementations in this application, refer to the foregoing embodiments. Details are not described herein again.

Figure 7:
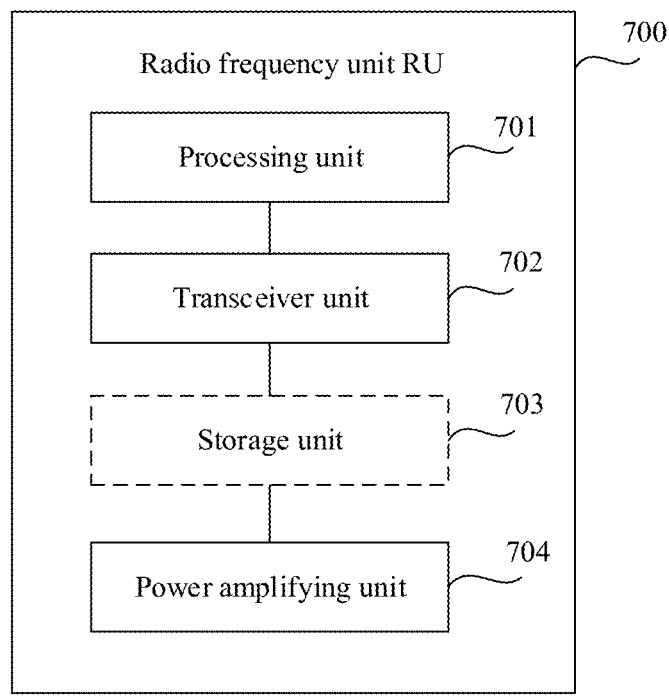
FIG. 7 is a schematic structural diagram of an RU according to this application.

Based on the foregoing content and the same concept, this application provides an RU that is configured to perform any solution on the RU side in the foregoing method. FIG. 7 is a schematic structural diagram of an RU according to this application. As shown in FIG. 7, the RU 700 includes a processing unit 701, a transceiver unit 702, and a power amplifying unit 704. Optionally, the RU 700 further includes a storage unit 703. In this example, the RU 700 may be the RU 102 in FIG. 1, and may execute the solution correspondingly executed by the RU in FIG. 2 or FIG. 3A and FIG. 3B.

It should be understood that division into units of the foregoing RU is merely logical function division. During actual implementation, all or some of the units may be integrated into a physical entity, or may be physically separated. In this application, the processing unit 701 in FIG. 7 may be implemented by the processor 501 in FIG. 5, the transceiver unit 702 in FIG. 7 may be implemented by the transceiver 502 in FIG. 5, and the power amplifying unit 704 may be implemented by the amplifier 505 in FIG. 5. In other words, in this application, the processing unit 701 may perform the solution performed by the processor 501 in FIG. 5, the transceiver unit 702 may perform the solution performed by the transceiver 502 in FIG. 5, and the power amplifying unit 704 may perform the solution performed by the amplifier 505 in FIG. 5. For other content, refer to the foregoing content. Details are not described herein again.

For related content of the foregoing optional implementations in this application, refer to the foregoing embodiments. Details are not described herein again.

All or some of the foregoing embodiments may be implemented by using software, hardware, or a combination thereof. When a software program is used to implement the embodiments, all or some of the embodiments may be implemented in a form of a computer program product. The computer program product includes one or more instructions. When the computer program instructions are loaded and executed on a computer, the procedures or functions according to this application are all or partially generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, a fiber, or a twisted pair) or wireless (for example, infrared, radio, or microwave) manner. The computer storage medium may be any medium accessible by a computer, or a data storage device, such as a server or a data center, integrating one or more media. The medium may be a magnetic medium (for example, a floppy disk, a hard disk, a magnetic tape, or a magnetic optical disc (MO)), an optical medium (for example, an optical disc), a semiconductor medium (for example, a ROM, an EPROM, an EEPROM, or a solid-state drive (SSD)), or the like.

This application is described with reference to the flowcharts and/or the block diagrams of the method, the device (system), and the computer program product according to this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A power consumption control method, comprising:
    detecting, by a baseband unit (BBU), a load of a to-be-detected cell;
    when the load of the to-be-detected cell is less than a first threshold, determining, by the BBU, a first allowable power of a carrier corresponding to the to-be-detected cell, wherein the first allowable power is less than a maximum allowable power of the carrier corresponding to the to-be-detected cell;
    sending, by the BBU, the first allowable power to a radio frequency unit (RU), to indicate to the RU to adjust, based on the first allowable power, a bias voltage of a power amplifier (PA) corresponding to the carrier corresponding to the to-be-detected cell;
    when the load of the to-be-detected cell is greater than a second threshold, determining, by the BBU, a second allowable power of the carrier corresponding to the to-be-detected cell, wherein the second allowable power is equal to the maximum allowable power of the carrier corresponding to the to-be-detected cell, and the second threshold is greater than the first threshold;

sending, by the BBU, the second allowable power to the RU, to indicate to the RU to adjust, based on the second allowable power, the bias voltage of the PA corresponding to the carrier corresponding to the to-be-detected cell; and after receiving a response message from the RU, canceling, by the BBU, an amplitude limitation performed on a power of the carrier corresponding to the to-be-detected cell, wherein the response message is sent by the RU after the RU completes adjusting the bias voltage.

2. The method according to claim 1, wherein the determining, by the BBU, a first allowable power of a carrier corresponding to the to-be-detected cell comprises:

determining, by the BBU based on the maximum allowable power of the carrier corresponding to the to-be-detected cell and a preset amplitude limiting percentage parameter, the first allowable power of the carrier corresponding to the to-be-detected cell, wherein the amplitude limiting percentage parameter is a positive number less than or equal to 1.

3. A power consumption control baseband unit (BBU), comprising:

a processor, configured to: detect a load of a to-be-detected cell, and when the load of the to-be-detected cell is less than a first threshold, determine a first allowable power of a carrier corresponding to the to-be-detected cell, wherein the first allowable power is less than a maximum allowable power of the carrier corresponding to the to-be-detected cell; and a transceiver, configured to send the first allowable power to a radio frequency unit (RU), to indicate to the RU to adjust, based on the first allowable power, a bias voltage of a power amplifier (PA) corresponding to the carrier corresponding to the to-be-detected cell;

wherein the processor is further configured to:

when the load of the to-be-detected cell is greater than a second threshold, determine a second allowable power of the carrier corresponding to the to-be-detected cell, wherein the second allowable power is equal to the maximum allowable power of the carrier corresponding to the to-be-detected cell, and the second threshold is greater than the first threshold; and after receiving a response message from the RU, cancel an amplitude limitation performed on a power of the carrier corresponding to the to-be-detected cell, wherein the response message is sent by the RU after the RU completes adjusting the bias voltage; and wherein the transceiver is further configured to:

send the second allowable power to the RU, to indicate to the RU to adjust, based on the second allowable power, the bias voltage of the PA corresponding to the carrier corresponding to the to-be-detected cell; and receive the response message from the RU.

4. The BBU according to claim 3, wherein the processor is configured to:

determine, based on the maximum allowable power of the carrier corresponding to the to-be-detected cell and a preset amplitude limiting percentage parameter, the first allowable power of the carrier corresponding to the to-be-detected cell, wherein the amplitude limiting percentage parameter is a positive number less than or equal to 1.

5. A power consumption control radio frequency unit (RU), comprising:

a transceiver, configured to receive at least one first allowable power, wherein the first allowable power is a current allowable power of a carrier corresponding to a to-be-detected cell when a load of the to-be-detected cell is less than a first threshold, and the first allowable power is less than a maximum allowable power of the carrier corresponding to the to-be-detected cell; and a processor, configured to:

determine a target bias voltage of a power amplifier (PA) based on the at least one first allowable power, and adjust a bias voltage of the PA to the target bias voltage; and determine a target maximum allowable power of the PA, and determine the target bias voltage corresponding to the target maximum allowable power, wherein the target maximum allowable power is a sum of first allowable powers of carriers in the PA; or the target maximum allowable power is a sum of a maximum allowable power of a first carrier in the PA and the first allowable power of the carrier corresponding to the to-be-detected cell, wherein the first carrier is a carrier on which power amplitude limiting does not need to be performed.

6. The RU according to claim 5, wherein the transceiver is further configured to:

send a response message to a baseband unit (BBU), wherein the response message is used to indicate that the RU completed adjusting the bias voltage.

* * * * *